Dec. 27, 1960

C. J. SCHULTZ

RECEIVING SYSTEM 2,966,585

Filed Aug. 19, 1957

2 Sheets-Sheet 1

INVENTOR.
Curtis J. Schultz

BY Mueller & Aichele

Attys.

Dec. 27, 1960 C. J. SCHULTZ 2,966,585

RECEIVING SYSTEM

Filed Aug. 19, 1957 2 Sheets-Sheet 2

INVENTOR.
Curtis J. Schultz
BY Mueller & Aichele
Attys.

2,966,585
Patented Dec. 27, 1960

2,966,585

RECEIVING SYSTEM

Curtis J. Schultz, Elmhurst, Ill., assignor to Motorola, Inc., Chicago, Ill., a corporation of Illinois Filed Aug. 19, 1957, Ser. No. 678,981
4 Claims. (Cl. 250—20)

This invention relates to signal-receiving systems, and more particularly to a system including a central station and remote receivers in which the signal from the receiver providing the best signal is reproduced at the central station.

In order to provide good radio reception at all times, signal receiving systems have been provided wherein a plurality of radio receivers are physically separated from each other so that there is a good chance that a least one of the receivers will receive a strong signal at all times. This has been found to be effective against fading which results from multipath signal transmission and varying atmospheric conditions. The signals are selected and the best signal or a combination of signals may be reproduced. Such systems have been generally called "diversity receiving systems" and have been of various types.

This problem also exists in systems in which a plurality of receivers are positioned along a course for receiving signals from a moving object travelling along the course. For example, it may be desired to receive signals from a train moving along a track by receivers positioned along the track. Another example is the requirement for communication between a microwave relay system and vehicles moving along the system which communicate with stations of the microwave system through very high frequency radio equipment on the vehicles and at the stations of the system. In these instances, it is desired to automatically use the signal from the reeciver at a station which receives the best signal so that continuous communication is provided even though a particular receiver may at times not provide a good signal.

One system of this type is disclosed and claimed in copending application Serial No. 278,068, filed March 22, 1952, now Patent No. 2,835,794, issued May 20, 1958, for "Receiving System" by J. A. Doremus and assigned to the common assignee. The system disclosed in that application has been commercially used and provides excellent selectivity, and reproduces the signal from the receiver having the best signal. However, this system requires critical adjustments to compensate for variation in tube characteristics, and also is subject to loss of differential sensitivity as the number of channels is increased and/or the signal strength in the individual channels is increased.

It is, accordingly, an object of the invention to provide a new and improved signal-receiving system.

Another object of the invention is to provide a signal-receiving system of the type described above in which there is no loss of differential sensitivity for a large number of channels and for very strong signals in each channel.

A further object of the invention is to provide a signal-receiving system in which a high differential sensitivity is provided along with stability and low maintenance costs.

One feature of the invention is the provision of a signal-receiving system in which a plurality of receiving stations at different locations transmit signals to a central station where the signals from one of the receiving stations are reproduced. A control voltage proportional to the strength and quality of the signal at each of the receiving stations is produced thereat and transmitted to the central station and applied to a matching or voting system in which the highest control voltage causes relays to exclusively connect the signals from its station to a reproducer.

Another feature of the invention is the provision of a signal in which the control voltages developed from the individual stations are applied to amplifiers individual to each station, and the outputs of the amplifiers are used to energize windings of differential relays connected in opposition to one another. The outputs of the amplifiers are matched against one another by means of the differential relays so that the output of the amplifier associated with the station having the strongest signal causes that signal to be connected to the reproducer. There may be sufficient relays to match each amplifier against every other amplifier with the contact system of the relays being so designed that the strongest amplifier closes contacts to the channel from which its control voltage is derived. Alternatively, the amplifiers may be matched together in pairs and then each pair matched against another pair.

The invention provides a signal-receiving system having receivers located at several diversely positioned stations and a central station. The intelligence signals at each receiver are detected, amplified, and transmitted at audio frequency along with a control signal at a frequency above the frequency of the intelligence signals, with the frequency of the control signal being proportional to the strength and quality of the signal at that receiver. The intelligence signals and the frequency modulated control signals may be applied to the central station over a single channel which may be either a wire or radio channel. At the central station a matching or voting system is provided including a plurality of devices, one for each of the receivers, for separating the control signal and the intelligence signals from one another and for applying the intelligence signals to contacts of a relay system. Each of these devices also includes amplifying means for the control signal, a limiter for limiting the frequency modulated control signal, a discriminator for deriving a voltage proportional to the frequency of the frequency modulated control signal and an amplifier which amplifies the voltage derived from the discriminator. The voltages from these devices are applied to amplifiers of a voting system which feed windings of differential relays of the voting system. The output from each of the separating and amplifying devices is matched against the outputs of the other devices to actuate the relay system so that only the strongest intelligence signals are applied to a loudspeaker. The voting system may be such that each amplifier is matched against the output of every other amplifier through the differential relays so that the output of each amplifier is compared with that of every other amplifier. In an alternative form of the invention, the amplifiers may be matched against one another in pairs, and then each pair is matched against another pair so that half of the receiving stations are eliminated at each stage and only the strongest of the receiving stations is finally connected to the loudspeaker.

Figure 1:
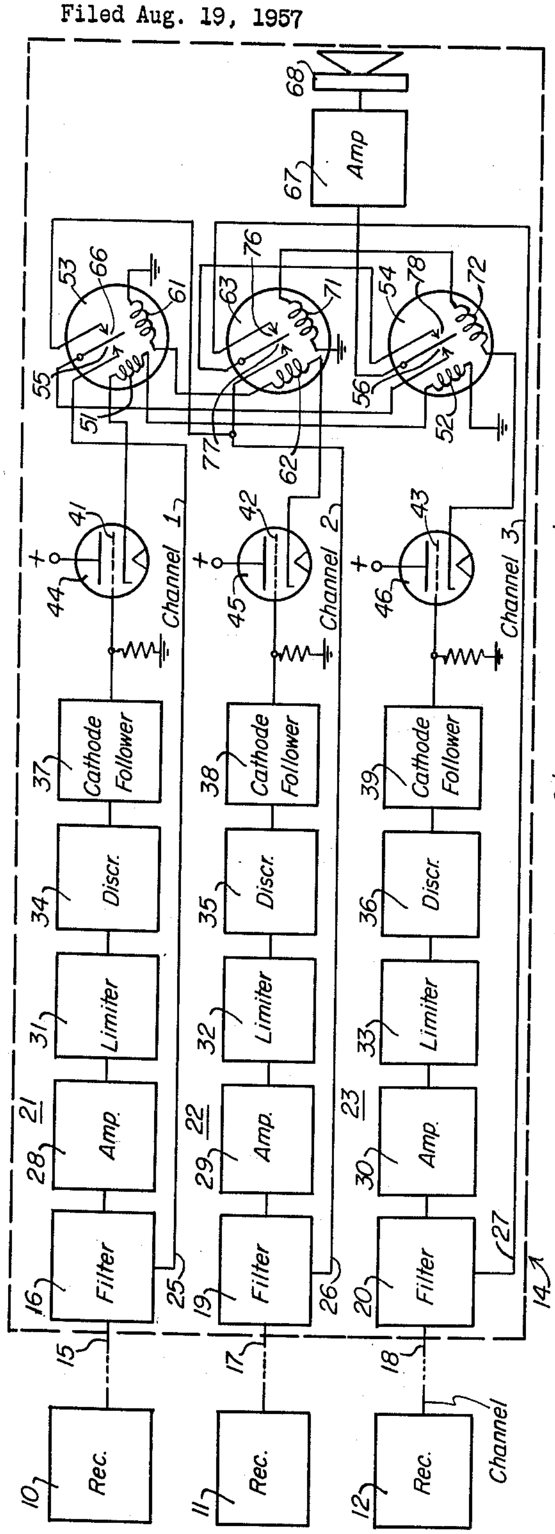
Fig. 1 is a schematic view of a signal-receiving system forming one embodiment of the invention with portions thereof shown in block diagram.

There is shown in Fig. 1 a plurality of receivers 10, 11 and 12 located at diverse points and all connected to a central station 14. The receiver 10 is connected by a transmission line 15 to a filter 16 of a separating and amplifying device 21 at the central station and the receivers 11 and 12 are connected by transmission lines 17 and 18 to filters 19 and 20 respectively of separating and amplifying devices 22 and 23 also at the central station. Each of the receivers 10, 11, and 12 may receive the signal from a single transmitter, which may be a transmitter in an automobile for example, and amplifies and detects the signal as described in the above mentioned co-pending application. The detected signal below 3000 cycles per second is transmitted along the transmission line. Each receiver also derives a control signal whose frequency is proportional to the strength and quality of the signal received or being transmitted from the receiver. The control signal may also be transmitted along the line 15, 17, or 18 associated with that receiver. The control signal is at a frequency above normal speech frequencies and preferably extends in the range from 3500 to 4000 cycles per second.

At the central station, each of the filters 16, 19 and 20 separates the detected or intelligence signals from the control signals and transmits the intelligence signals along conductors 25, 26 and 27. The frequency modulated control signals are transmitted from the filters 16, 19 and 20 to amplifiers 28, 29 and 30 which amplify the signals and apply their outputs to limiters 31, 32 and 33 respectively, whose outputs are supplied to discriminators 34, 35 and 36 respectively. The discriminators 34, 35 and 36 derive voltages from the control signals proportional to the frequencies of the control signal waves. These voltages are applied to cathode follower amplifier stages 37, 38 and 39, which in turn supply their output voltages, which serve as control voltages, to the control grids 41, 42 and 43 of triodes 44, 45 and 46 respectively.

Figure 2:
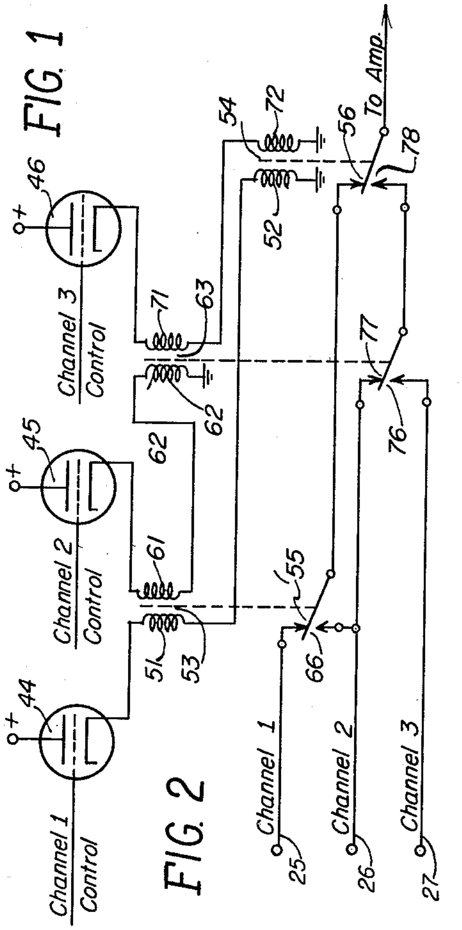
Fig. 2 is a simplified wiring diagram of a portion of the system shown in Fig. 1.

Each of the triodes 44, 45 and 46 is conductive in proportion to the strength of the control voltage applied to its grid which in turn is proportional to the strength and quality of the intelligence signal received by the receiver associated therewith. Hence, the triode 44 supplies current proportional to the characteristic of the associated intelligence signal to windings 51 and 52 of differential relays 53 and 54, and the effect of the current flowing through the windings 51 and 52 is to tend to close contacts 55 and 56 of these relays. This is clearly shown in Fig. 2. The output of the triode 45 is connected through its cathode to winding 61 of the relay 53 and winding 62 of a differential relay 63.

Considering the operation of relay 53, the effect of current flowing from the triode 45 to the winding 61 is such as to oppose the effect of the current from triode 44 flowing to the winding 51, and if the signal on the triode 45 is stronger than that on the triode 44, the winding 61 prevails to open contacts 55 and close contacts 66. Opening of contacts 55 prevents the intelligence signal of the line 25 from being connected to an amplifier 67 and a loudspeaker 68. The output of the triode 46 is proportional to the control voltage of the cathode follower 39, and is applied through relay windings 71 and 72 of the relays 63 and 54 respectively. The winding 71 is in opposition to the winding 62 so that the differential relay 63 matches the control voltage output from channel 2 with that of channel 3. Similarly, the winding 72 is opposed to the winding 52 so that the differential relay 54 matches the strength and quality of the signal of channel 1 against that of channel 3.

If the control voltage from channel 3 is higher than that from channel 2, the winding 71 prevails over the winding 62 and closes contacts 76 and opens contacts 77. Closing contacts 76 connects channel 3 to contacts 78 of the relay 54, and if the signal from channel 3 is stronger than the signal from channel 1, the winding 72 prevails over the winding 52 and closes the contacts 78 so that the conductor 27 is connected to the amplifier 67 and supplies its signal to the loudspeaker 68. If the control signal from the channel 1 is stronger than the control signals from channel 2 and channel 3, the triode 44 is more conductive than either the triode 45 or the triode 46 and the winding 51 prevails over the winding 61 to close contacts 55. Also, the winding 52 is predominant against the winding 72 and closes the contacts 56. The contacts 55 and 56 connect the conductor 25 from channel 1 to the amplifier 67. Similarly, if the signals from channel 2 are the strongest, the conductor 26 is connected by contacts 77 and 78 to the amplifier 67. Thus, the relay branch system connects only the strongest signal to the amplifier 67.

Figure 3:
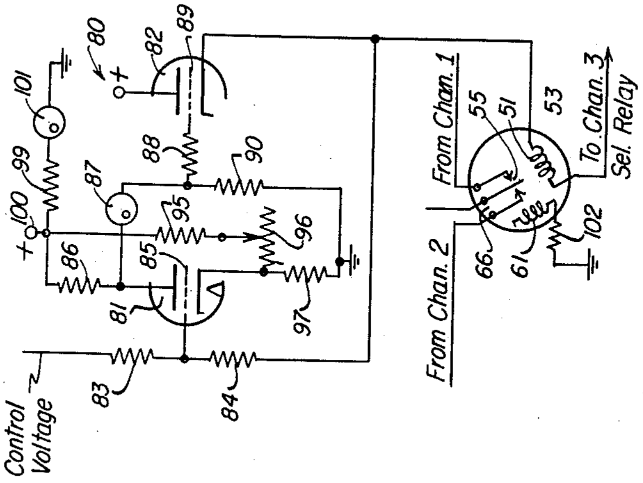
Fig. 3 is a circuit diagram of an amplifier which may be used in the system shown in Fig. 1.

In Fig. 3 there is shown a detailed circuit diagram of an amplifier stage 80 which may be used for any of the amplifier stages 44, 45 and 46 in the system of Fig. 1 wherein the amplifiers are shown in simplified form. The stage 80 includes triode sections 81 and 82 which may be provided in a single tube. The control voltage is derived from an amplifier corresponding to the cathode follower 37 of Fig. 1 and provides a voltage inverted with respect to the strength of the intelligence signal of the corresponding channel. This voltage causes current flow through resistors 83 and 84 and applies the inverted voltage to the grid 85 of the vacuum tube 81. Thus, as the voltage applied across resistors 83 and 84 gets lower in proportion to the strength of the intelligence signal, the tube 81 is reduced in conductivity, and current flow through load resistor 86 raises the voltage applied through voltage regulator tube 87 and grid resistor 88 to grid 89 of the tube 82. A resistor 90 is connected between the tube 87 and ground to form a voltage divider therewith. As the voltage on the grid 89 is raised, the tube 82 is more conductive and causes more current to flow through the winding 51 of the relay 53. A constant voltage is maintained on the cathode of the tube 81 by means of a resistor 95, potentiometer 96, and resistor 97 connected to ground, the cathode being connected to the junction of potentiometer 96 and the resistor 97. A resistor 99 is connected between the B+ terminal 100 and a gas filled tube 101 connected to ground to provide illumination so that tube 87 will ionize at the same potential.

Amplifier stages as illustrated by the stage 80 may be substituted for the simple amplifier stages formed by the triodes 44, 45 and 46, with the cathode follower amplifiers 37, 38 and 39 being replaced by inverting type amplifiers of a well known type so that the inverting effect of the tube 81 causes the conductivity of the tube 82 to be directly proportional to the strength of the control signal.

The following circuit constants are given merely by way of example, and are not intended to limit the scope of the invention in any way.

| | | |
|---|---|---|
| Resistor 83 | kilohms | 220 |
| Resistor 84 | do | 220 |
| Resistor 86 | do | 22 |
| Resistor 88 | do | 330 |
| Resistor 90 | megohm | 1 |
| Resistor 95 | kilohms | 10 |
| Resistor 97 | do | 2.7 |
| Resistor 99 | do | 150 |
| Resistor 102 | do | 1.8 |

Figure 4:
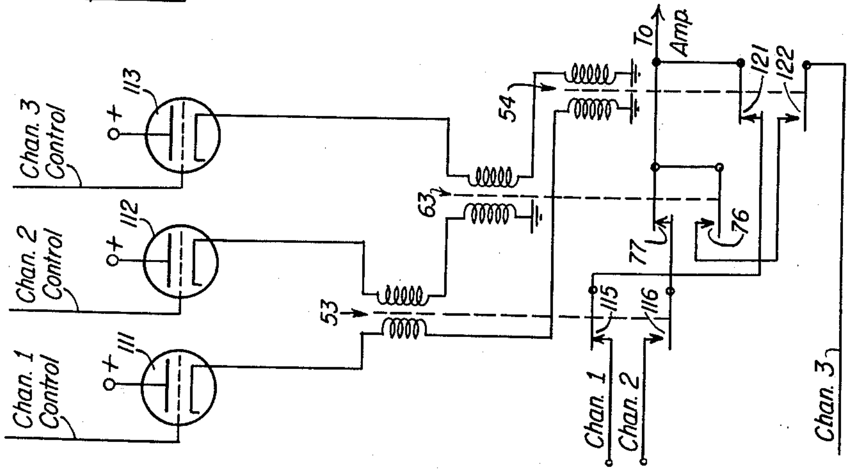
Fig. 4 is a schematic view of a portion of a signal-receiving system forming an alternative embodiment of the invention.

A modified signal receiving system is shown in Fig. 4 including voting selectors 111, 112, and 113 which are actuated by the cathode follower circuits 37, 38, and 39. The strengths of the signals from channel 1 and channel 2 are compared or matched against one another by the differential relay 53, and if the control voltage from channel 1 is stronger than that from channel 2, the relay 53 opens contacts 115 and closes contacts 116. This insures that the signal from channel 2 will not be reproduced and gives channel 1 a chance to be reproduced, depending upon the matching of the signal of channel 1 against channel 3. This matching is effected by the differential relay 54 which compares the output of the selector 111 with that of the selector 113. Selector 113 is conductive in proportion to the strength of the signal on channel 3, which supplies its control signal and intelligence signals on the transmission line 18. If the intelligence signal on channel 1 is stronger than that on channel 3 also, the relay 54 closes contacts 121 and opens contacts 122 so that the intelligence signal line 27 from channel 3 is cut out and the signal from the intelligence line 25 from channel 1 travels through the contacts 115 and the contacts 121 to the amplifier and the loudspeaker. However, if the signal from channel 2 is the strongest, the conductivity of the amplifier 112 is greatest, and it actuates the relay 53 to close contacts 116 and open contacts 115. It also actuates relay 63 to close contacts 77 and open contacts 76, which cuts out channel 3, and the contacts 116 and 77 connect conductor 26 from the filter 20 to the amplifier supplying power to the reproducer. Similarly, if the signal on channel 3 is the strongest, then the amplifier stage 113 is the most conductive, and the differential relay 63 matching channels 2 and 3 against one another cuts out channel 2 and connects in channel 3, and the differential relay 54 matching channel 1 against channel 3 cuts out channel 1 and closes contacts 122 of the relay 54 to connect channel 3 to the amplifier supplying power to the loudspeaker.

Figure 5:
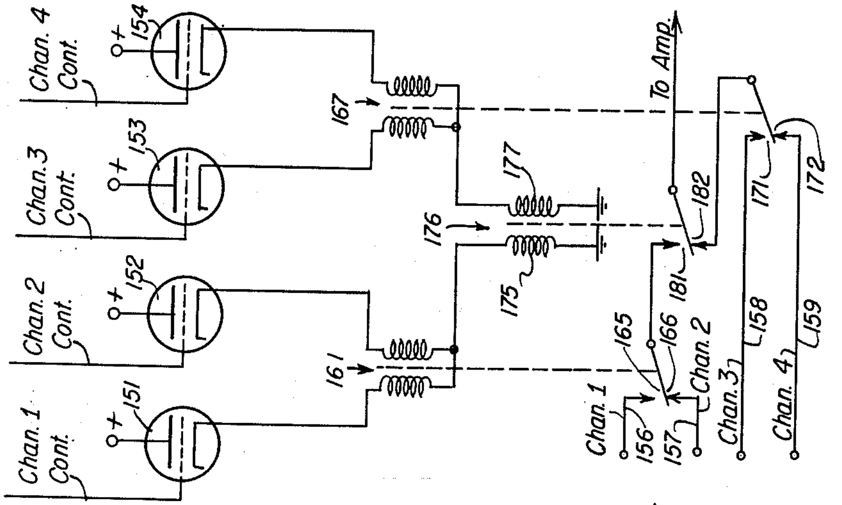
Fig. 5 is a schematic view of a portion of a signal-receiving system forming another embodiment of the invention.

In Fig. 5 there is shown voting selector stages 151, 152, 153, and 154 operating from four receiving stations. Control voltages proportional to the strength of the intelligence signals are applied to lines 156, 157, 158, and 159 similarly to the application of intelligence signals to the lines 25, 26, and 27 in the system of Fig. 1 described above. The output of the stage 151 is matched against the output of the stage 152 by a relay 161, and if the output of the stage 151 is greater than that of the stage 152, the relay 161 closes contacts 165 and opens contacts 166. The strength and quality of the intelligence signals of channel 3 and channel 4 are compared by the voltages applied to the grids of the vacuum tubes of the stages 163 and 164, the outputs of which are matched against each other by a differential relay 167. Depending upon which of the intelligence signals on channels 3 and 4 is the stronger, the relay 167 will close one of the contacts 171 and 172. The two stages 151 and 152 are combined in winding 175 of differential relay 176 and the outputs of the stages 153 and 154 are combined in winding 177 of the differential relay 176. If the output of the two stages 151 and 152 is stronger than the combined output of the stages 153 and 154, contacts 181 are closed and contacts 182 are opened so that either channel 1 or channel 2, depending upon which has the stronger signal thereon, is connected to the amplifier driving the loudspeaker of the system. If the output of the stages 153 and 154 is stronger than the output of the stages 151 and 152, the contacts 181 are opened and the contacts 182 are closed so that the channel 3 or channel 4, whichever has the stronger intelligence signal thereon, is connected to the amplifier and reproducing device.

Figure 6:
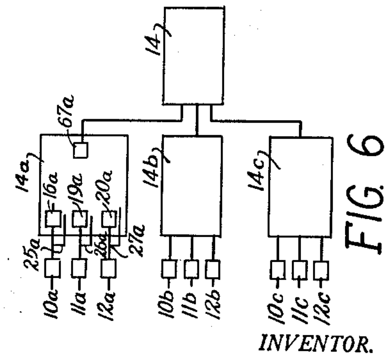
Fig. 6 is a block diagram of a signal-receiving system forming still another embodiment of the invention.

Fig. 6 illustrates a modification of the basic signal-receiving system shown in Fig. 1 which utilizes a plurality of sub-stations 14a, 14b, and 14c interposed between the central station 14 and a plurality of receivers. Receivers 10a, 11a, and 12a are connected to the sub-station 14a, and corresponding groups of receivers denoted by the subscripts *b* and *c* are connected respectively to the sub-stations 14b and 14c. The sub-station includes an amplifier 67a which applies signals to the central station. The conductors 25a, 26a, and 27a which apply signals to the amplifier 67a are connected directly to the output of the receivers so that both the control signals and intelligence signals are applied thereto. The signals from the receivers are also applied to the filters 16a, 19a, and 20a, which correspond to the filters 16, 19, and 20 of Fig. 1 and the control signals are selected thereby and control the application of signals from the conductors 25a, 26a, and 27a to the amplifier 67a in the manner previously described. The output of the amplifier 67a is connected to the central station 14 instead of to a loudspeaker. The sub-stations 14b and 14c are modified in the same manner as is sub-station 14a, and except for these modifications, the connections for the sub-stations are the same as for the central station 14 of Fig. 1 which have been previously explained.

Thus, at each sub-station, a preliminary selection is made and the receiver with the strongest control signal in each of the groups of receivers denoted *a*, *b*, and *c* is coupled to the amplifiers of the sub-stations. The outputs of these amplifiers which are composed of the selected intelligence signals plus the associated control signals are applied to the central station 14. The signals from the sub-stations are applied to the central station each over a single channel. At the central station, these intelligence signals and control signals are separated, and a final selection is made so that only the best intelligence signal is applied to the amplifier 67. It is apparent that the sub-stations 14a, 14b, and 14c may be provided in separate housings which may be located remotely from the central station 14 and from each other, and a larger number of receivers may be accommodated merely by increasing the number of sub-stations.

The above described receiving system serves to precisely compare the strength of the signals from the several receiving stations and applies only the best signal to the loudspeaker. The voting circuits are simple and inexpensive in construction while highly effective in operation, and require a minimum of maintenance.

I claim:

1. In a signal-receiving system including a plurality of sub-stations and a central station, with each sub-station being coupled to a plurality of receiver means each producing a control signal and an intelligence signal, a single channel connecting each receiver means to a sub-station for applying the control signal and the intelligence signal thereto, apparatus for selecting said intelligence signals in accordance with a characteristic of said control signals including, a plurality of devices at each sub-station each connected to one receiver means separating the control signal from the intelligence signal thereof, said devices each producing a control voltage from the control signal, output signal means at each sub-station, a plurality of differential relays having a pair of opposing windings and contacts for selectively connecting the outputs of the receiver means actuated thereby to said output signal means, and means at each sub-station connecting windings of at least two of said relays in series to each of said devices for applying current through said windings related to the control voltages for actuating said differential relays to connect to said output signal means the output from the receiver means associated with the device producing the largest control voltage, a single channel connecting the output of each sub-station to the central station and applying thereto the intelligence signal and the control signal of the receiver connected at each substation, and a plurality of devices at the central station each separating the control signal from the intelligence signal applied from one sub-station and providing a control voltage from such control signal, a reproducer at the central station, and a plurality of differential relays having a pair of opposing windings and contacts actuated thereby for connecting the outputs of the intelligence signals from the sub-stations to the reproducer, and means connecting windings of at least two of said last-mentioned relays in series to each of said last-mentioned devices for applying current through said windings related to the control voltages applied to the central station from the sub-stations for actuating said last mentioned differential relays to connect to said reproducer the output from the sub-station providing the largest control voltage at the central station.

2. In a signal-receiving system including a plurality of receiver means each producing a control signal and an intelligence signal, apparatus for selecting said intelligence signals in accordance with a characteristic of said control signals including in combination, a plurality of devices individually coupled to said receiver means and each separating the control signal from the intelligence signal of one receiver means, each of said devices having a first output at which the intelligence signal of one receiver means is applied and a second output at which a control current is produced which is related to the control signal accompanying the intelligence signal, a plurality of differential relays each having a pair of opposing windings and relay contacts actuated thereby, signal output means, a signal circuit connected to said first outputs of said devices, said relay contacts, and said signal output means for selectively applying the intelligence signals to said signal output means, and a control circuit including a circuit portion connected to said second output of each of said devices and connecting windings of at least two of said relays in series to each device and applying the control current therefrom through said windings in series, said differential relays operating in response to the relative strength of the current in the opposing windings thereof to actuate said contacts thereof to apply to said signal output means the intelligence signal from the device which applies the strongest current to said relay windings connected thereto.

3. In a signal-receiving system including a plurality of remotely positioned receivers each producing a control signal and an intelligence signal, and a plurality of channels connecting the receivers to a central station with the control signal and the intelligence signal from each receiver being applied over a single channel, a selecting system at the central station for reproducing the intelligence signals in accordance with a characteristic of the control signals including in combination, a plurality of devices individually coupled to said channels and each separating the control signal from the intelligence signal of one receiver, each of said devices having a first output at which the intelligence signal of one receiver is applied and a second output at which a control current is produced which is related to the control signal accompanying the intelligence signal, a plurality of differential relays each having a pair of opposing windings and relay contacts actuated thereby, signal reproducing means, a signal circuit connected to said first outputs of said revices, said relay contacts, and said signal reproducing means for selectively applying the intelligence signals to said signal output means, and a control circuit including a circuit portion connected to said second output of each of said devices and connecting windings of at least two of said relays in series to such second output and applying the control current therefrom through said windings in series, said differential relays operating in response to the relative strength of the currents in the opposing windings thereof applied from said devices to actuate said contacts thereof to apply to said signal reproducing means the intelligence signal from the device which applies the strongest current to said relay windings connected thereto.

4. In a signal-receiving system for operation with a plurality of communication channels each producing an intelligence signal and a control signal indicative of the quality of the associated intelligence signal, apparatus for selecting said intelligence signals in accordance with a characteristic of said control signals including in combination, a plurality of devices individually coupled to said receiver means and each separating the control signal from the intelligence signal of one receiver means, each of said devices having a first output at which the intelligence signal of one receiver means is applied and a second output at which a control voltage is applied which is related to the control signal accompanying the intelligence signal, a plurality of differential relays each having a pair of opposing windings and relay contacts actuated thereby, signal output means, a signal circuit connected to said first outputs of said devices, said relay contacts, and said signal output means for selectively applying the intelligence signals to said signal output means, and control means including an amplifier connected to said second output of each of said devices and controlled by said control voltage therefrom and connected to said windings of at least two of said relays with said windings being connected in series, each of said amplifiers including an electron amplifier device and voltage regulator means coupled thereto whereby said amplifier provides current in series through the connected windings which varies directly with the control voltage applied thereto, said differential relays operating in response to the relative strength of the currents in the opposing windings thereof applied from said amplifiers to actuate said contacts thereof to apply to said signal output means the intelligence signal from the device which provides the strongest control voltage.

References Cited in the file of this patent

UNITED STATES PATENTS

| | | |
|---|---|---|
| 1,922,059 | Ohl | Aug. 15, 1933 |
| 2,004,126 | Moore | June 11, 1935 |
| 2,292,222 | Haigis | Aug. 4, 1942 |
| 2,737,578 | Bartelink | Mar. 6, 1956 |
| 2,870,326 | Steiner | Jan. 20, 1959 |